United States Patent

[11] 3,564,216

[72] Inventor John F. Laycak
West Mifflin, Pa.
[21] Appl. No. 716,641
[22] Filed Mar. 27, 1968
[45] Patented Feb. 16, 1971
[73] Assignee United States Steel Corporation

[54] DATA CORRELATION SYSTEM
4 Claims, 1 Drawing Fig.
[52] U.S. Cl. .................................................. 235/92;
33/129
[51] Int. Cl. .................................................. G06m 7/00;
G06m 3/14
[50] Field of Search ......................................... 235/92, 68,
73, 70, 33; 328/37; 307/221; 33/129, 132;
340/174SR

[56] References Cited
UNITED STATES PATENTS
2,869,241 1/1959 Witt .............................. 33/136
3,214,576 10/1965 Propster ....................... 235/168

Primary Examiner—Maynard R. Wilbur
Assistant Examiner—Robert F. Gnuse
Attorney—Rea C. Helm ABSTRACT: A data correlation system used in a process line for elongated product includes a pulse generating tachometer driven at a speed proportional to product speed before entering a product accumulator, and a second tachometer driven at a speed proportional to product speed after the accumulator. A bidirectional counter which is operated by the pulses is connected to an N-level matrix decoder to provide an output corresponding to the variable product length in the accumulator. One of a series of logic AND gates is enabled by the decoder to insert into a corresponding shift register element a data signal from a sensor appropriate for the type of data desired. The shift register, operated by pulses from the second tachometer is connected to a data accumulator and logger which receives the data signal from the shift register as the product region associated with the data signal passes a reference point in the process line.

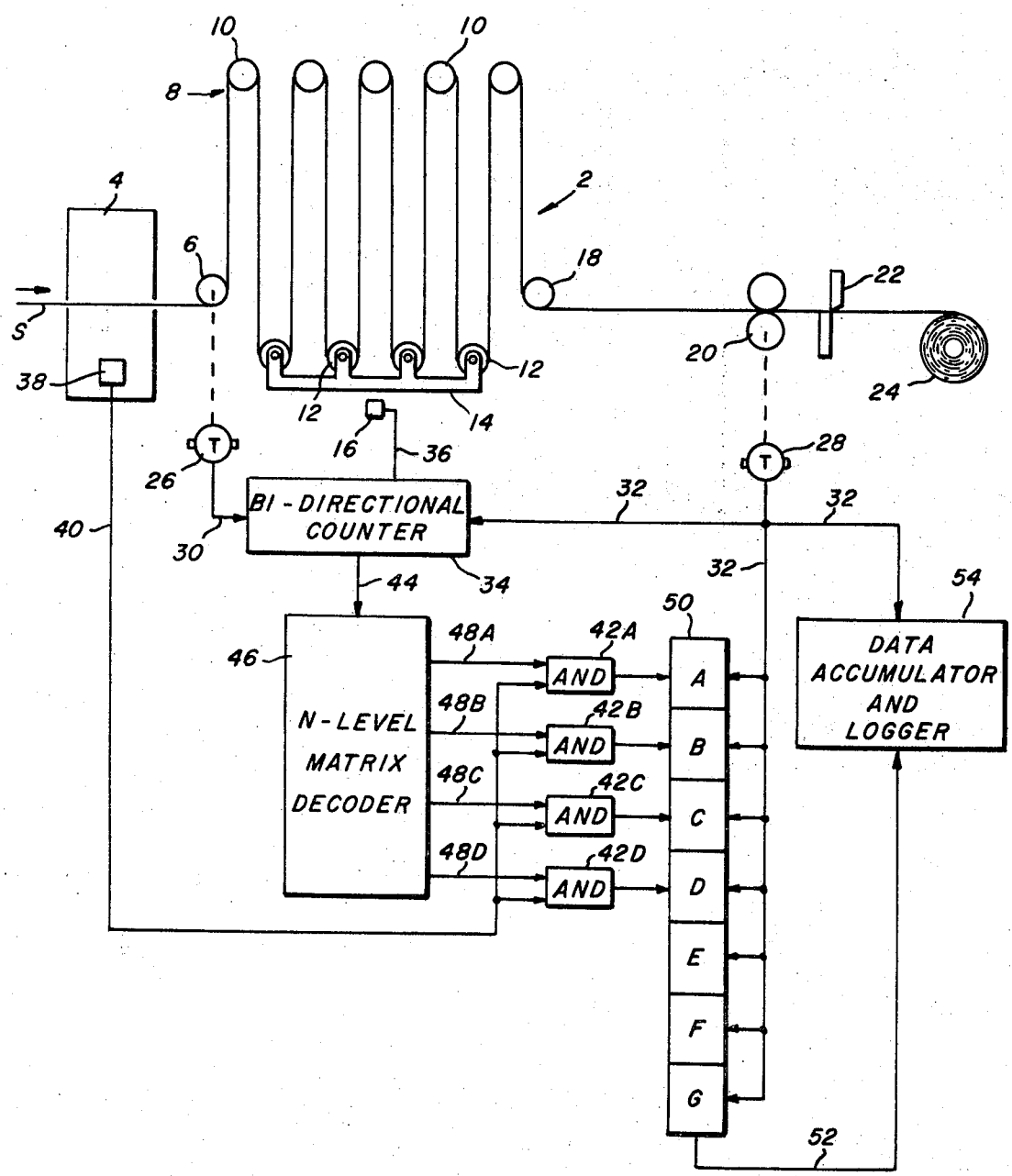

DATA CORRELATION SYSTEM

This invention relates to apparatus for data correlation on a moving elongated product process line where product length between points of measurement and readout is variable.

In a metallic vacuum deposition strip processing line it is essential that the strip move continuously through a deposition chamber. If the finished product is desired in coil form the strip must be stopped at the coiler to remove a completed coil and start the next coil. An accumulator is used between the chamber and the coiler to accumulate the strip continuously emerging from the chamber while changing to the next coil.

The process also requires that production data be taken at the chamber and related to that part of the strip in the chamber at the time of measurement. In order to relate the data to the appropriate part of the product in a finished coil or parts of a finished coil it is necessary to provide a system to hold the data while the appropriate part of the product moves from the chamber through the accumulator and process line and then to release the data when the appropriate part of the product arrives at a reference point such as the exit shear. This requires that the fixed length of product on the process line and the varying length of product in the accumulator be continuously known and the data released in accordance with these product lengths.

It is therefore an object of my invention to provide apparatus to delay release of production data accumulated on a strip process line with a varying product storage until the part of the product associated with the measurement subsequently passes a designated point.

Another object is to provide apparatus on a strip process line that can record continuously developed production data related to its associated product location within a finished coil of product when the coils are removed from the process line at random.

Still another object of my invention is to provide apparatus to continuously determine the length of elongated product in an accumulator and to recalibrate the apparatus.

These and other objects will be more apparent after referring to the following specification and attached drawing, in which:

The single FIG. is a schematic view of an elongated strip processing line including the data correlation system of my invention.

Referring now to the drawing, reference numeral 2 indicates a strip processing line, such as a metallic vacuum deposition line. Strip S passes through a deposition chamber 4, under a measuring roll 6, and into a looping tower or accumulator 8. The looping tower 8 consists of a set of fixed horizontal rolls 10 around which the strip passes and second set of rolls 12 mounted on a vertically movable carriage 14 around which the strip passes. A detector 16, such as a photoelectric cell and light source, detects vertical motion of the carriage 14 past detector 16. The strip S passes from the accumulator 8 under guide roll 18 and through drive rolls 20, one of which is a measuring roll. A shear 22 cuts the strip after a coil has been formed on a coiler 24.

A pulse generating tachometer 26 is driven by measuring roll 6 and a second pulse generating tachometer 28 is driven by measuring roll 20. The tachometers generate one electrical pulse per unit length of strip passing over their respective measuring rolls, such as 1 pulse per foot of length. Outputs 30 and 32 of tachometers 26 and 28, respectively, are connected to a bidirectional counter 34. The bidirectional counter 34 may be an Anadex bidrectional counter Model CF-400R manufactured by Anadex Instruments, Inc., Van Nuys, Cal. Output 36 of detector 16 is connected to the reset of bidirectional counter 34. The parts so far described are conventional and similar apparatus is shown in Rendel U.S. Pat. No. 2,306,750 dated Dec. 29, 1942, and Witt U.S. Pat. No. 2,869,241 dated Jan. 20, 1959.

The desired production data such as chamber pressure, temperature, pressure level, coating thickness or magnetic field strength is picked up by a sensor 38 in chamber 4. The sensor may be any known device adapted to detect the desired data and convert the data into an electrical signal such as a thermocouple for measuring temperature. Output 40 of sensor 38 is connected to series of AND gates 42A, 42B, 42C, and 42D such as Model R113, manufactured by Digital Equipment Corporation, Maynard, Mass.

Output 44 of bidirectional counter 34 is connected to an N-level matrix decoder 46 such as a combination of Models R151 and R111 manufactured by Digital Equipment Corporation, Maynard, Mass. Outputs 48A, 48B, 48C, and 48D of the N-level matrix decoder 46 are connected to AND gates 42A, 42B, 42C and 42D, respectively.

AND gates 42A, 42B, 42C and 42D are connected to stages A, B, C and D, respectively, of a shift register 50. Shift register 50 may be a Model R202 manufactured by Digital Equipment Corporation, Maynard, Mass. Output 32 of tachometer 28 is also connected to shift register 50. Output 52 of shift register 50 is connected to a data accumulator and logger 54 such as a data accumulator Model linc-eight, manufactured by DIgital Equipment Corporation, Maynard, Mass. Output 32 of tachometer 28 is also connected to data accumulator and logger 54.

When the strip process line 2 is in operation, the strip S is continuously fed through chamber 4 by conventional drive means, not shown. When sufficient strip has accumulated to form a coil, drive rolls 20 are stopped. While the strip is being sheared, the finished coil removed from the coiler, and the next coil started on the coiler, strip accumulates in the accumulator 8, lowering the carriage 14. When the drive rolls 20 are restarted for the next coil, the accumulated strip is withdrawn from the looping tower 8 and the carriage 14 raised in preparation for the next coil in the conventional manner.

As strip S passes through the process line, tachometer 26 adds pulses to the counter 34 and tachometer 28 subtracts pulses from the counter, thus counter 34 indicates continuously the amount of strip between measuring rolls 6 and 20. In order to compensate for slippage of the measuring rolls 6 and 20, each time carriage 14 moves past detector 16 and the counter 34 is reset to the exact calculated strip length between rolls 6 and 20 when the carriage is at detector height. Detector 16 is located at the center of carriage 14 so that any tilt of the carriage will not produce error.

Bidirectional counter 34 produces a length signal 44 which is used by the N-level matrix decoder 46 to produce a series of signals, one for each unit length of strip that is stored between measuring rolls 6 and 20. Four such signals 48A to 48D are shown on the drawing, representing four lengths. Thus, when signal 44 indicates a first length, only signal 48A will be active. When signal 44 indicates a length 1 foot longer than the first length only signal 48B is active, and if signal 44 indicates a length 3 feet longer than the first length only signal 48D will be active. While only four such signals are discussed and shown on the drawing, it is obvious that the number of signals 48 from the N-level matrix decoder 46, the number of AND gates 42 and the number of elements in the shift register 50 connected to the AND gates 42 must be the same and must also equal the number of units of length of strip that can be stored in the looping tower 8 between the extremes of travel of carriage 14. As an example, if 250 feet and 1,000 feet represent the storage limits, 750 elements would be required.

While the N-level matrix decoder 46 is enabling a particular one of the AND gates 42, the sensor 38 is sending a data signal 40 to all the AND gates 42. The data signal 40 then passes into a particular shift register element through the one AND gate enabled by the decoder 46.

Pulses from tachometer 28 then shift the data signal 40 through successive shift register elements until the signal reaches the last element of the shift register connected to AND gate 42, shown on the drawing as element D. The data signal 40 is then shifted successively through shift register elements 50E, F and G, which represents the fixed number of units of length of strip normally in process between the sensor 38 and the exit reference point, for example, the shear 22, that is not between measuring rolls 6 and 20. Although three such elements are shown in the drawing it is obvious that the number of elements is determined by the locations of the various components in the strip processing line. The data signal 40 is finally shifted out of the shift register 50 when the particular portion of the strip from which the data originated reaches shear 22, here used as a reference point. The signal is then recorded or accumulated in the data accumulator and logger 54. The data signals 40 may be recorded in footage sequence by using tachometer output 38, they may be averaged on a coil basis, or they may be programmed in some other manner within the capabilities of the data accumulator and logger 54. The measuring rolls 6 and 20 may be located anywhere on the process line so long as the variable storage or accumulator is between the rolls. Although normally the carriage 14 would move up and down once each coil, more frequent movements would reset the counter more frequently and thus improve accuracy. While a fixed number of shift storage elements are used to delay the output of the data signal to represent fixed lengths on the strip process line, the delay can be accomplished by other means. For example, a magnetic drum or magnetic tape could be driven by measuring roll 20 to control readin and readout in the data accumulator and logger 54. Such devices would be useful where more than one type of data is desired which would require additional data sensors, gates, shift registers, and appropriate fixed delays, particularly if the data is sensed at different locations on the process line.

While one embodiment of my invention has been shown and described, it will be apparent that other adaptations and modifications may be made without departing from the scope of the following claims.

I claim:

1. A data correlation system for production data accumulated from an elongated product moving through a process line and acquired at a fixed location in said process line, said process line having a bidirectional counter continuously measuring the units of length of product in a variable length storage unit located in said process line beyond said fixed location comprising sensor means at said fixed location in said process line for producing an electrical data output signal related to production data associated with a portion of said product, means connected to said bidirectional counter for producing a plurality of storage signals each representing a specific number of units of elongated product length in said variable length storage unit, a shift register connected to said means for producing storage signals and having a first plurality of stages equal in number to the number of said storage signals, and means connected to said means for producing storage signals for inserting said electrical data output signals into said shift register.

2. Apparatus according to claim 1 including a second fixed location in said process line located beyond said variable storage unit, means for generating an electrical pulse for each unit of elongated product length passing said second fixed location, and means responsive to said pulse generating means for sequentially shifting said electrical data output signals in said shift register.

3. Apparatus according to claim 2 including a second plurality of stages in said shift register connected sequentially to said first plurality of stages and equal in number to the number of units of elongated product length equivalent to the distance from said fixed location to said variable length storage unit and from said storage unit to said second fixed location, and means responsive to said pulse generating means for sequentially shifting said electrical data output signals in said second plurality of stages in said shift register and reading out said electrical data output signals from said second plurality of stages from said shift register.

4. Apparatus according to claim 3 including a data accumulator and logger connected to the output of said shift register and responsive to said pulse generating means.